J. W. Kendall,

Foot for Tubs Buckets &c.

No. 3,053. Reissued July 28, 1868.

Witnesses

Francis D. Pastorius

George W. Wood.

Inventor

Joseph W. Kendall

N. PETERS, PHOTO-LITHOGRAPHER WASHINGTON, D. C.

United States Patent Office.

JOSEPH W. KENDALL, OF PHILADELPHIA, PENNSYLVANIA.

*Letters Patent No.* 71,311, *dated November* 26, 1867; *reissue No.* 3,053, *dated July* 28, 1868.

IMPROVED FOOT FOR TUBS, BUCKETS, &c.

The Schedule referred to in these Letters Patent and making part of the same.

TO ALL WHOM IT MAY CONCERN:

Be it known that I, JOSEPH W. KENDALL, of the city of Philadelphia, and State of Pennsylvania, have invented a new and useful Improvement to be Applied to Tubs, Buckets, Barrels, &c.; and I do hereby declare that the following is a full, clear, and exact description of the same, reference being had to the accompanying sheet of drawings, and to the letters of reference marked thereon.

My invention consists in providing a bucket, tub, barrel, &c., with movable adjustable feet, by means of which sufficient space is left between the bottom of the tub, &c., and that on which it stands, for the free circulation of air, which absorbs all moisture, and prevents the bottom of the tub from rotting, as is hereinafter shown.

On reference to the accompanying sheet of drawings, making part of this specification—

Figure 1:
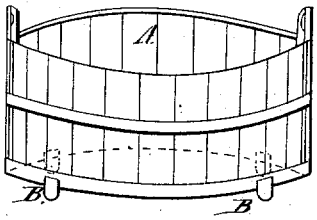

Figure 1 is a perspective view of a tub, and

Figure 3:
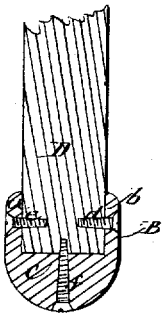
Figure 2:
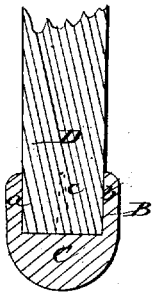
Figure 4:
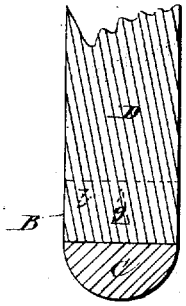

Figures 2, 3, and 4 show different methods of securing the feet to the chime or rim formed by the ends of the staves of the tub.

Similar letters refer to similar parts in the several views.

A is a tub, to the chime of which are fixed one or more feet, B. The base, C, of each is made of any suitable material or form. In the present instance it is slightly rounded at the bottom, and has two upwardly-projecting sides, *a* and *b*, between which the chime D of the barrel takes. The feet B raise the chime and bottom of the tub or other vessel, so that they are held, as it were, in suspension, and a free circulation of air had beneath the tub, which keeps it dry and free from rotting.

I do not confine myself to the configuration of the foot B, nor to any manner of fixing it to the chime of the barrel, knowing that it can be fixed to it in various different ways, as, for instance, in—

Fig. 2 it is shown fixed to the chime D, by means of one or more prongs, *c*, (shown in dotted lines,) which projects upwardly from the base C into the chime.

Fig. 3 shows the foot B fixed to the chime D, either by a pin, *d*, a screw, *e*, which takes into the chime from the side of the foot, or by a screw or pin, *f*, taking into the chime through the bottom of the foot.

Fig. 4 shows the foot, B, fixed to the chime D, by means of a wedge, *g*, (in dotted lines,) on the inner surface of either of the sides *a* and *b*. The point of the wedge enters the chime first. After the foot is driven firmly on, the wood of the chime closes behind the base of the wedge, and holds it firmly in place.

What I claim as my invention, and desire to secure by Letters Patent, is—

A movable adjustable foot for tubs, buckets, barrels, &c., substantially for the purpose shown.

In testimony whereof, I hereunto sign my name to this specification in presence of two subscribing witnesses.

JOSEPH W. KENDALL.

Witnesses:

FRANCIS D. PASTORIUS,

GEORGE W. WOOD.